United States Patent
Fang et al.

(10) Patent No.: US 10,691,378 B1
(45) Date of Patent: Jun. 23, 2020

(54) DATA REPLICATION PRIORITY MANAGEMENT

(71) Applicant: International Business Machines Corporation, Armonk, NY (US)

(72) Inventors: Min Fang, Shanghai (CN); Qing Chuan Sun, Shanghai (CN); Jiang Yu, Shanghai (CN); Si Cong Zhou, Shanghai (CN); Shu Ting Chen, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/205,761

(22) Filed: Nov. 30, 2018

(51) Int. Cl.
*G06F 3/06* (2006.01)

(52) U.S. Cl.
CPC ............ *G06F 3/0659* (2013.01); *G06F 3/065* (2013.01); *G06F 3/067* (2013.01); *G06F 3/0611* (2013.01)

(58) Field of Classification Search
CPC ...... G06F 3/0659; G06F 3/0611; G06F 3/065; G06F 3/067
See application file for complete search history.

(56) References Cited

U.S. PATENT DOCUMENTS

| | | | |
|---|---|---|---|
| 7,032,089 B1 | 4/2006 | Ranade | |
| 7,778,972 B1 | 8/2010 | Cormie | |
| 7,856,419 B2 | 12/2010 | Karamanolis | |
| 8,190,561 B1 | 5/2012 | Poole | |
| 8,433,681 B2 | 4/2013 | Patel | |
| 8,843,710 B2 | 9/2014 | Bernbo | |
| 8,862,617 B2 | 10/2014 | Kesselman | |
| 8,898,108 B2 | 11/2014 | Berinde | |
| 9,659,031 B2 | 5/2017 | Zunger | |
| 9,804,966 B1* | 10/2017 | Sadanandan | ........ G06F 12/0862 |
| 2011/0040792 A1 | 2/2011 | Perry | |
| 2015/0026128 A1* | 1/2015 | Drobychev | ............. G06F 16/23 |
| | | | 707/634 |
| 2015/0186043 A1* | 7/2015 | Kesselman | ............. G06F 16/27 |
| | | | 711/162 |
| 2015/0324258 A1* | 11/2015 | Browne | ................ G06F 3/0683 |
| | | | 714/6.3 |
| 2016/0275125 A1* | 9/2016 | Drobychev | ............. G06F 16/23 |

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Than Nguyen
(74) *Attorney, Agent, or Firm* — Robert J. Shatto

(57) ABSTRACT

A computer receives, at a target node, a replication target update, wherein the replication target update comprises a write frequency of a replication target and a size of the replication target. The computer creates a replication task to perform replication based upon the replication target update. The computer calculates a priority value of the replication task wherein the priority value is based upon the write frequency of the replication target and the size of the replication target. The computer inserts the replication task into a priority queue. The computer processes the replication task.

20 Claims, 5 Drawing Sheets

(56) References Cited

OTHER PUBLICATIONS

Zhang, et al., "A Priority Queue Algorithm for the Replication Task in HBase", Journal of Software, vol. 8, No. 7, Jul. 2013, pp. 1765-1769, <https://pdfs.semanticscholar.org/d470/100d7b88bc8cf6e85d08e4d2b1080534fd91.pdf>.

Zhipeng, et al., "Dynamic Replication Strategies for Object Storage Systems*", in X. Zhou et al. (Eds.): EUC Workshops 2006, LNCS 4097, pp. 53-61, https://link.springer.com/content/pdf/10.1007%2F11807964_6.pdf>.

\* cited by examiner

DATA REPLICATION PRIORITY MANAGEMENT

BACKGROUND

One way to protect data is through replication. Data replication can provide protection by creating and maintaining duplicate copies of data such that data loss at one node can be minimized. In a distributed storage system, data often needs to be synchronized between multiple instances. Currently, most methods of data replication focus on the way replication is distributed between all nodes to which data is replicated. Some methods take into account the read access properties of data. For example, replication requests can be performed with higher priority for data which is read accessed with higher frequency. Other methods consider the state of a node. However, existing methods involve drawbacks including frequent replication for data with high write frequency, which increases costs involved with time for replication and bandwidth required for replication. Additional drawbacks exist, including latency of read time on remote nodes, such as for data with pending replication requests.

SUMMARY

Disclosed herein are embodiments of a method, system, and computer program product for data replication. A computer receives, at a target node, a replication target update, wherein the replication target update comprises a write frequency of a replication target and a size of the replication target. The computer creates a replication task to perform replication based upon the replication target update. The computer calculates a priority value of the replication task wherein the priority value is based upon the write frequency of the replication target and the size of the replication target. The computer inserts the replication task into a priority queue. The computer processes the replication task.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
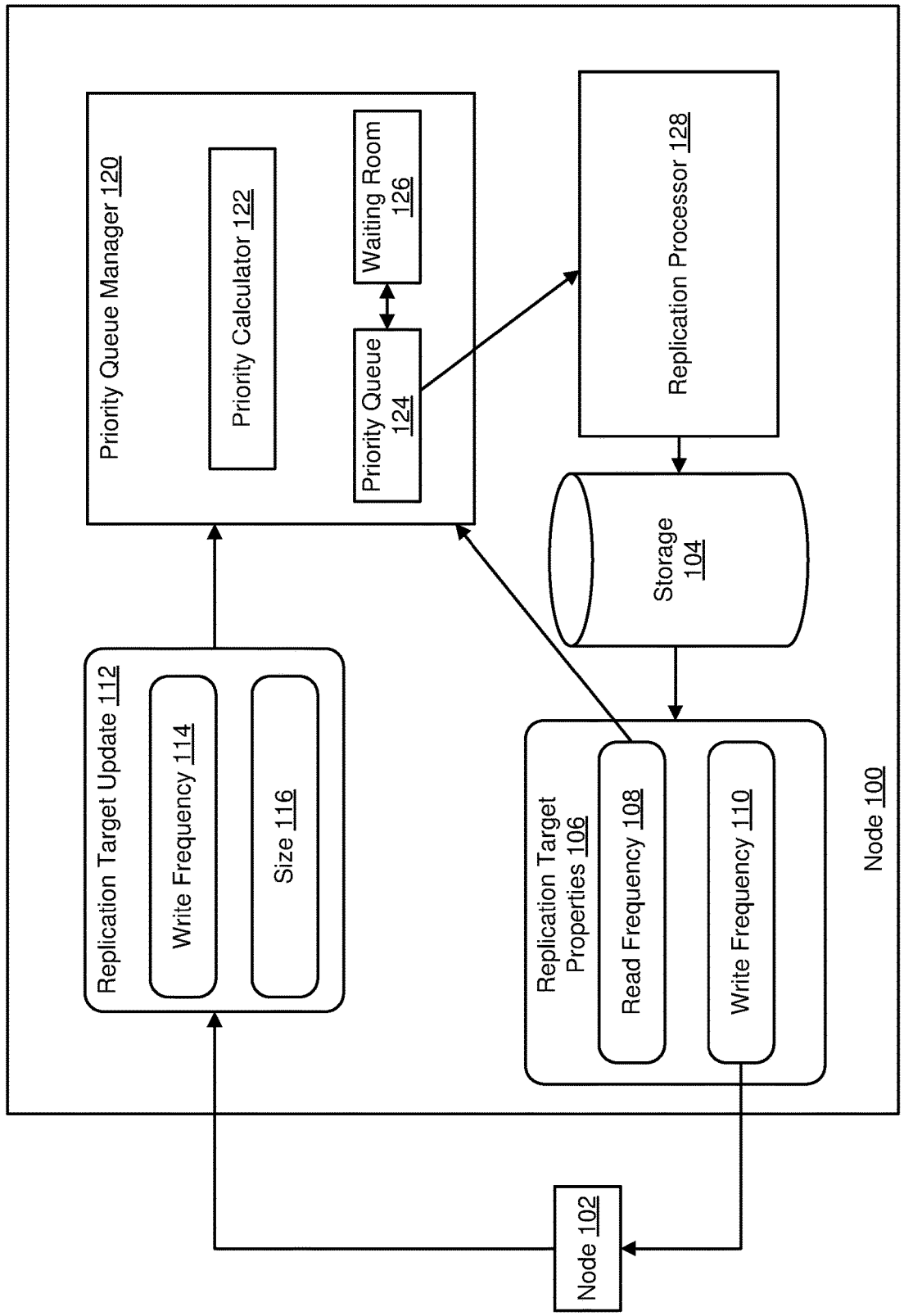
FIG. 1 depicts a block diagram for data replication using a priority manager, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to data replication, and more specifically, to data replication using a priority manager. While the present disclosure is not necessarily limited to such applications, various aspects of the disclosure can be appreciated through a discussion of various examples using this context.

Data replication can be useful in many endeavors and can proceed principally by either synchronous replication, such that data on all nodes is replicated at the same time, or asynchronous replication, such that data can be replicated at different times for different nodes, including on a scheduled basis. Synchronous replication can ensure greater consistency of data between nodes as the data on all nodes is replicated at the same time. However, synchronous replication can require specialized hardware, can be more costly, and can be problematic over long distances. For some kinds of applications, including workflow applications, the need for synchronous replication is lower and asynchronous replication can be more cost effective.

Asynchronous replication can proceed by replicating data on nodes on a priority basis, such that higher priority data or higher priority replication requests can be performed before lower priority data or requests. Existing methods involve drawbacks including frequent replication for data with high write frequency, which increases costs involved with time for replication and bandwidth required for replication. Additional drawbacks exist, including latency of read time on remote nodes, such as for data with one or more pending replication tasks. By prioritizing data replication requests, lower priority requests can be delayed and multiple updates to data to be replicated can be performed at once, or only the most recent version of data to be updated can be replicated. This can save bandwidth and processing time.

In the context of this disclosure, data replication can involve, among other concepts, a source node (which contains data which has been updated and is to be replicated to other nodes), one or more replication targets (the data to be replicated), and one or more target nodes (which will receive replication target updates to perform replication of the replication targets).

Embodiments of the present disclosure include a data replication priority manager, which can include a priority calculator for calculating priorities of data replication tasks. Priority of data replication tasks can be calculated using various factors, including the size of the replication target (or alterations to the replication target), the replication target's read frequency on the target node, the replication target's write frequency on the source node, and the age of a data replication task.

The size of a replication target can affect the priority of a data replication request in an inverse relationship, i.e., larger replication targets are given lower priority and smaller replication targets are given higher priority. This priority relationship allows for bandwidth savings in that larger replication tasks can be delayed and may be combined with later tasks to replicate the same data.

The replication target's read frequency on the target node can proportionately affect the priority of a data replication request, i.e., the higher the read frequency of a replication target on a particular node, the higher the priority to replicate the replication target on that node is. This priority relationship ensures that frequently accessed data is kept up to date on nodes where it is accessed.

The replication target's write frequency on the source node can affect the priority of a data replication task in an inverse relationship, i.e., the higher the write frequency of a replication target, the lower the priority to replicate the replication target on a target node. This priority relationship is used due to the likelihood of frequently written data being replicated again before it is used on the target node, and thus the replication having been performed without contributing value.

Additionally, the age of a data replication task can affect the priority of the task. This priority relationship can give older tasks increased priority to avoid low priority tasks never getting performed and lingering in a priority queue or waiting room.

These improvements and/or advantages relating to the priority relationships are a non-exhaustive list of example advantages. Embodiments of the present disclosure exist which can contain none, some, or all of the aforementioned advantages and/or improvements. More or fewer priority relationships can be used in embodiments and remain within the scope of this disclosure. Particular priority relationships can exist for specialized applications or data replication purposes (e.g., particular types of data can be given higher or lower priority as appropriate to the use of that data and/or importance of the data being up to date).

Referring now to FIG. 1, depicted is a block diagram for data replication using a priority manager, in accordance with embodiments of the present disclosure. FIG. 1 includes a node 100, including depictions of some of the components of the node and some of the information contained within the node. Additionally, node 102 is shown to illustrate the interaction of node 100 with other nodes; however, for simplicity, the contents of node 102 are not shown. Node 102 can have similar or identical components as node 100. In some embodiments, more than two nodes will be present in a data replication system or network.

Nodes 100 and 102 can be computer systems which store data including, but not limited to, servers, cloud computing storage environments, personal computers, smartphones, or mainframes. Further description of the physical components of a node, such as node 100 or 102, is presented below in regard to FIG. 3. Each of nodes 100 and 102 can operate as a source node or a target node in embodiments. In many embodiments each node will perform both roles at different times or at the same time, as data is replicated to and from each node based on changes throughout the data replication environment. For example, a node can operate as a source node regarding a first file which is updated on the node and later operate as a target node when a second file is updated on another node. In a further example, a node can operate as a source node regarding a first file which is updated on the node, while operating as a target node due to an incoming replication target update (or already pending replication task).

Storage 104 of node 100 can contain the data found in node 100. This data can be present in many forms, including object-based data storage or block-based data storage. The form of storage 104 can vary in embodiments. Storage 104 can contain many pieces of data, whether objects, blocks, or other forms of data. One or more of these pieces of data can be replication targets.

Each replication target on a node 100 can have properties represented by replication target properties 106, and the properties can include read frequency 108 and write frequency 110. The read frequency 108 of the replication target can be used by node 100 in calculating the priority of a replication of the replication target on node 100. The read frequency 108 can be a count of how many times the replication target has been read, a ratio of how many times the replication target has read divided by a period of time, or other measure of the reads of the replication target. The write frequency 110 of the replication target can be used by other nodes, including node 102, in calculating the priority of a replication of to the replication target on those nodes. The write frequency 110 can be a count of how many times the replication target has been written, a ratio of how many times the replication target has written divided by a period of time, or other measure of the writes of the replication target. As indicated by the arrow from write frequency 110 to node 102, this information can be sent to other nodes. This can occur each time the replication target is replicated, including being sent along with the data to be replicated in the replication target on other nodes. In some embodiments the write frequency 110 can be sent to other nodes on a scheduled basis or sent as otherwise appropriate.

As indicated by the arrow from node 102 into node 100 and reaching replication target update 112, node 102 (or any other node not depicted in FIG. 1) can send a replication target update 112 to node 100. In some embodiments, this can occur when node 102 alters a replication target. In other embodiments, this can occur due to a request from node 100 for alterations to a replication target. Replication target update 112 can be an instruction to replicate data (a replication target) altered on node 102 to the storage 104 of node 100. This replication target update can relate to the same replication target present on node 100 (e.g., the same data is being altered on both node 100 and on node 102) or can relate to a different replication target. The replication target update 112 can include write frequency 114 and a size 116 of the alteration to the replication target. Write frequency 114 can be similar to that of write frequency 110 discussed above and can be for a different replication target or the same replication target. Size 116 of the replication target can be the size of the replication target as a whole or can be the size of the portion of the replication target to be replicated when performing the replication request.

In some embodiments, replication target update 112 can also include the substance of the alteration (not depicted) to the replication target. This information can be sent at the same time as replication target update 112 or can be sent at different times. For example, node 100 can receive replication target update 112, and later request the substance of the alteration when node 100 is ready to perform the replication task.

The replication target update 112 can be sent to node 100's priority queue manager 120 as indicated by the arrow. Specifically, the write frequency 114 and size 116 of the replication target update 112 can be sent to the priority queue manager 120. The read frequency 108 of the replication target on node 100 can also be sent to the priority queue manager as indicated by the arrow from read frequency 108. Priority queue manager 120 can take the form of a hardware device for managing priority or can exist as software or firmware. In some embodiments, a priority queue manager can be located outside of the node, such as on a cloud computing environment or other network connected device. Priority queue manager 120 can contain a priority calculator 122 which performs calculations of priority of replication tasks, priority queue 124 which is a listing or other representation of the order of replication tasks to be performed, and a waiting room 126 for low priority replication tasks. Priority queue manager 120 can create replication tasks, which are instructions to perform replications based upon each of the received replication target updates.

Priority calculator 122 can perform calculations of priority of replication tasks by assessing various priority relationships and the properties of a replication target and a replication target update 112. Priority of data replication tasks can be calculated using various factors, including the size 116 of the replication target, the replication target's read frequency 108 on the target node (node 100 in this example), and the replication target's write frequency 114 on the source node (node 102 in this example). As discussed above, the replication target's read frequency 108 can have a proportional relationship with priority, and size 116 of the replication target and the replication target's write frequency 114 can have an inverse relationship with priority. This can be expressed as priority=f (R, W, S), where R is the read frequency 108, W is the write frequency 114, and S is the size 116. Additionally, this can be expressed as:

$$\text{Priority} = \alpha \frac{R}{WS},$$

where α is a coefficient which may vary in embodiments to adjust priority as needed.

In some embodiments, the age of a data replication task can also be used by priority calculator 122. This can occur by adding another variable to the priority calculation, by incrementing the priority of a replication task as a unit of time passes (e.g., increase the priority of a replication task by 1 for each 2 minutes which have passed since the replication target update has been received), moving a replication task to the highest priority after a period of time has passed such that it is processed immediately if old enough, or using any other way to increase the priority of replication tasks over time.

Priority calculator 122 can recalculate or adjust the priority of replication tasks in real time or upon receipt of updated information. This can include an updated read frequency 108, as the replication target is read more or less on node 100. This can also include when another replication target update 112 is received which targets the same replication target as existing replication target update 112 which has not yet been processed. This concept will be discussed in more detail with regard to FIG. 2 below.

Priority queue 124 can be a listing or other representation of the order of replication tasks to be performed. Priority queue 124 can be updated in real time as new replication tasks are created and a priority value for them is calculated by priority calculator 122. In the event a priority queue 124 has a size limitation and becomes filled, a replication task can be moved to a waiting room 126. This can occur, for example, if there is not enough space in the main memory for the priority queue 124 and waiting room 126 can be present in a secondary memory. In some embodiments, waiting room 126 is not utilized.

A waiting room 126 can be used for replication tasks of the lowest priority. Priority queue manager 120 can move replication tasks from the waiting room 126 back to priority queue 124 when space in the priority queue becomes available. In some embodiments, priority queue manager 120 periodically checks whether replication tasks in waiting room 126 have a higher priority than one or more replication tasks in the priority queue 124 and moves replication tasks as appropriate. In some embodiments, age of a replication target update 112 may not be used by priority calculator 122 in calculating priorities, but rather a determination can be made if a replication task has remained in waiting room 126 for a set period of time without being processed. In such case, the priority queue manager 120 can reprioritize the replication task such that it is processed or has an increased likelihood of processing.

As replication tasks reach the first position or highest priority in the priority queue 124, the priority queue manager 120 can send the replication task to replication processor 128 and/or provide instruction to the replication processor 128 to process the replication task. Replication processor 128 can process the replication task by updating the replication target within storage 104. In some embodiments, the replication target update 112 may not contain the data of the replication target to be updated, but rather a description of and/or properties of the replication target. In such embodiments, replication processor 128 can request or retrieve the replication target (including from node 102) before processing the replication task.

Figure 2:
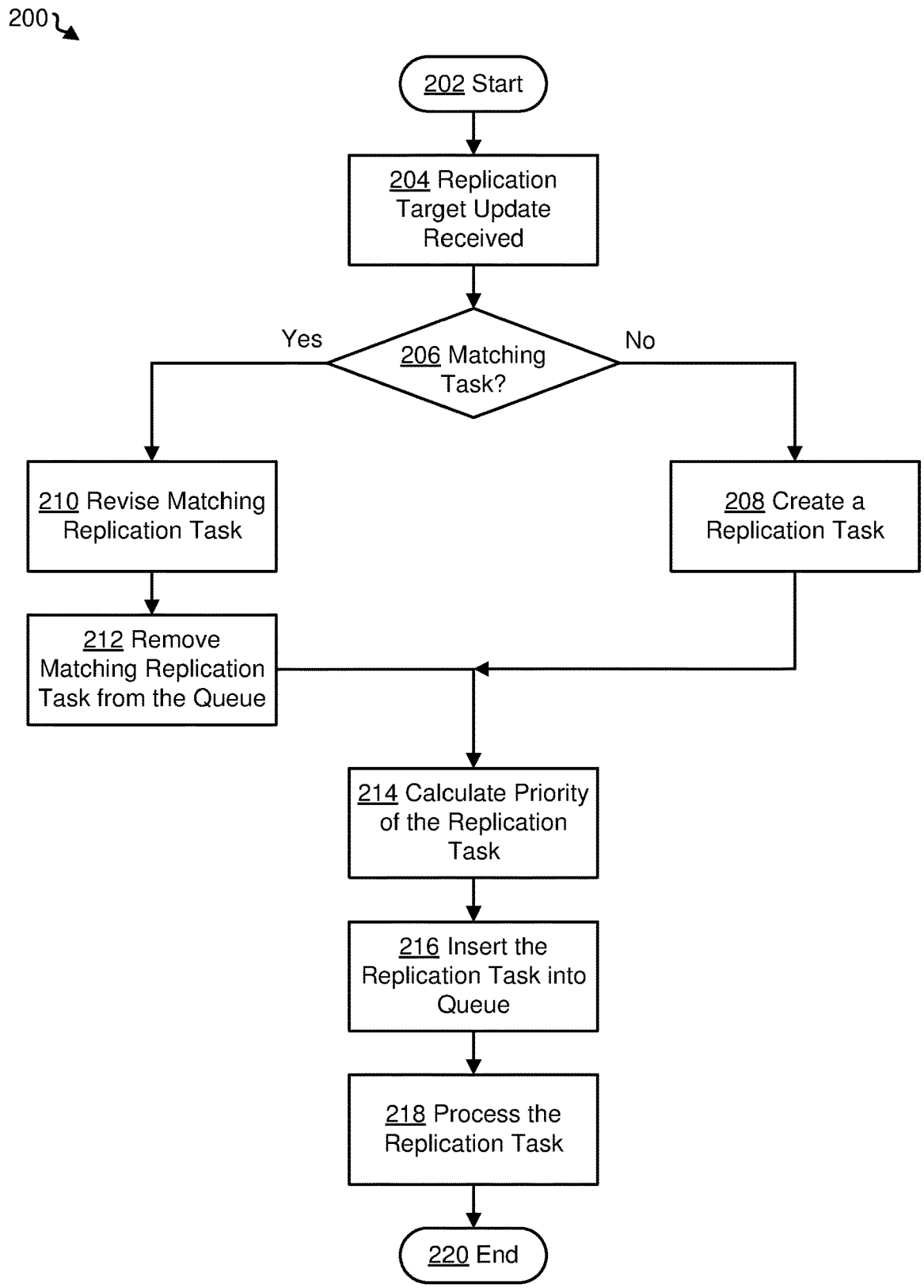
FIG. 2 depicts an example method for data replication using a priority queue manager, in accordance with embodiments of the present disclosure.
Figure 4:
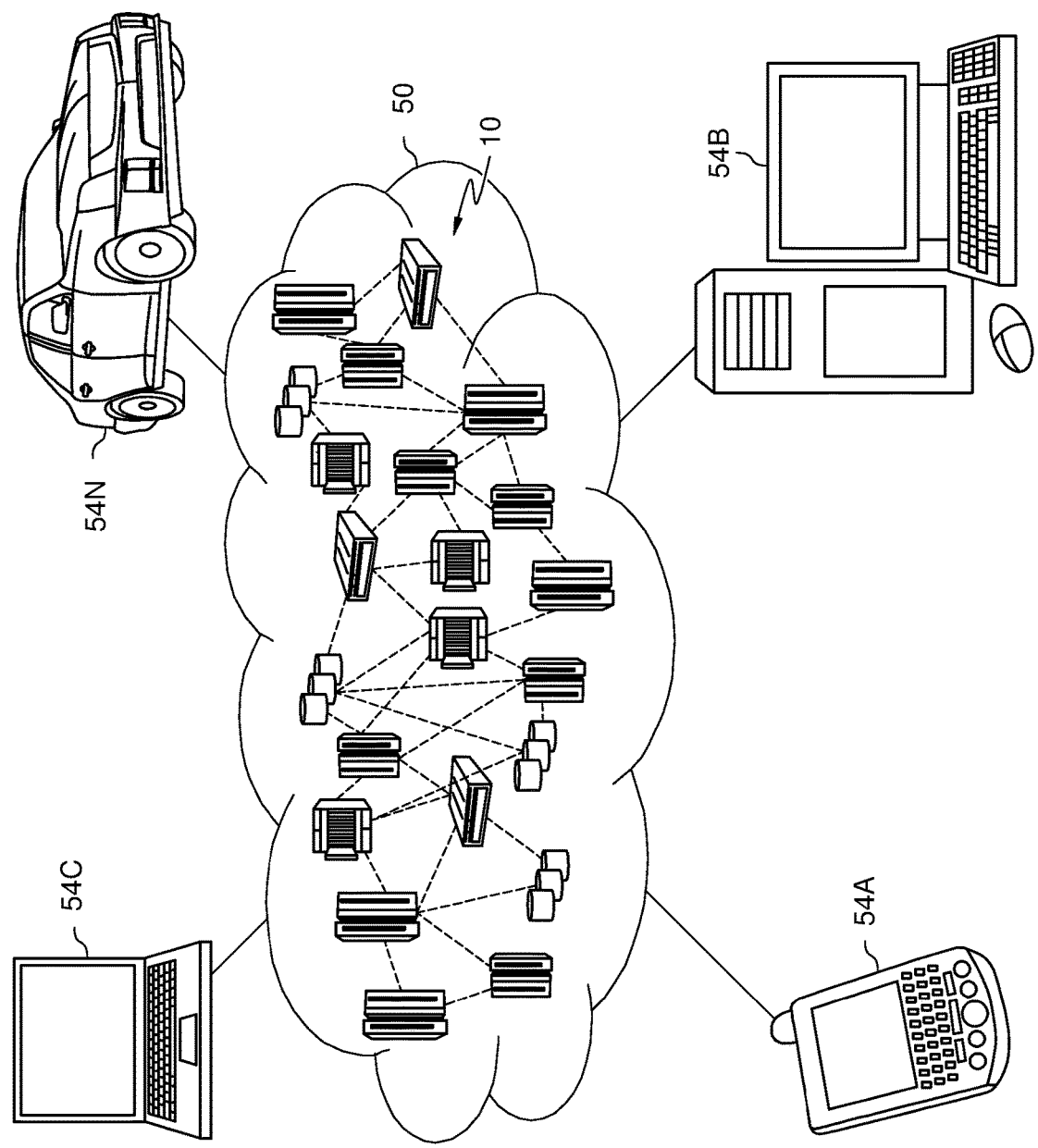
FIG. 4 depicts a cloud computing environment according to an embodiment of the present disclosure.
Figure 5:
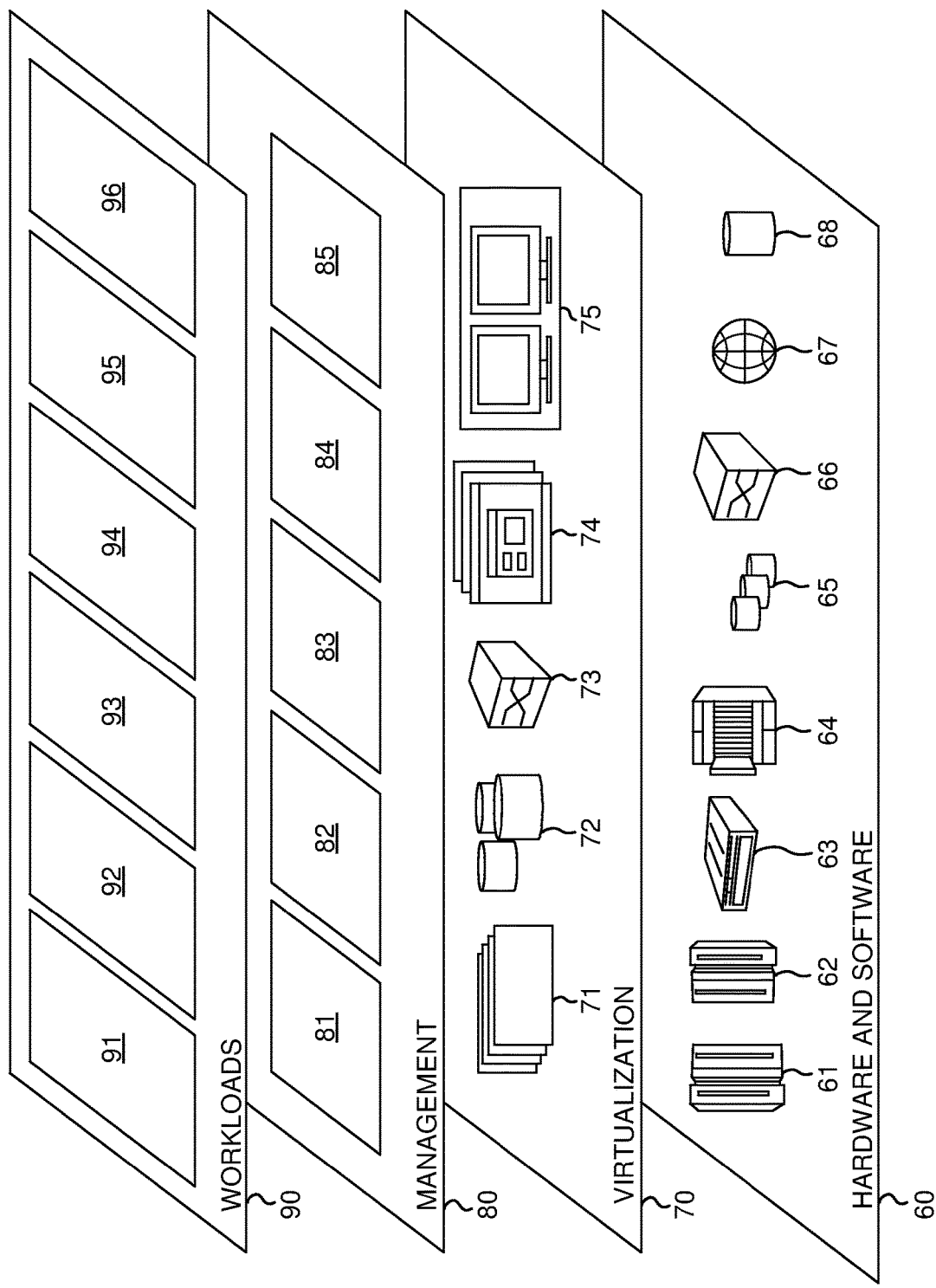
FIG. 5 depicts abstraction model layers according to an embodiment of the present disclosure.

Referring now to FIG. 2, depicted is an example method 200 for data replication using a priority queue manager, in accordance with embodiments of the present disclosure. Method 200 can include more or fewer operations than those depicted. Method 200 can include operations in different orders than those depicted. In some embodiments, method 200 can be performed by a node (such as node 100 or node 102 depicted in FIG. 1, or node 300 depicted in FIG. 3). In some embodiments, method 200 can be performed by one or more devices operated by a data replication service using a priority manager, including by devices utilizing cloud computing technology (such as depicted in FIGS. 4 and 5). In some embodiments method 200 can be implemented using hardware devices instead of, or in addition to, an application. In the following discussion, method 200 will be described as being performed by a target node using a priority manager, but the present disclosure is not limited to such.

From start 202, the target node receives a replication target update (such as replication target update 112 of FIG. 1) at 204. The replication target update can be sent by another computer node (i.e., a source node) in response to a data replication target being updated on that computer node. The replication target update can also be received in response to a request sent by the target node to the source node seeking replication target updates, including ones directed to a particular replication target.

At 206, the target node can analyze the replication target update received and determine whether the replication target update matches a replication task present in the priority queue or waiting room of the target node. Such a matching replication task may be a task yet to be performed. For the purposes of this application, a matching replication task does not need to be for an identical replication target update (i.e., the matching replication task does not need to be to perform the same changes to the replication target as the new replication target update indicates). Instead, a matching replication task is one which is directed to the same replication target. For example, a source node can send a replication target update to the target node to update a file, object, or block, which the priority queue manager used to create a replication task, and then the source node (or another source node) can send another replication target update to the target node regarding the same file, object, or block. In this example, the determination at 206 would be yes, there is a matching replication task (relating to the first sent update) to the replication target update received in method 200 (the second sent update).

If the determination at 206 was no, there was not a matching replication task, the priority queue manager creates a replication task at 208. The replication task can include instructions to perform replication using the information contained within the replication target update received. This can also include instructions to retrieve the substantive data alterations to be made to a replication target from a source node in embodiments where this data did not accompany the replication target update. This replication task can be given a timestamp relating to the creation time of the task, the time of receipt of the replication target update, or other relevant time. After operation 208, method proceeds to 214.

If the determination at 206 is yes, method 200 proceeds to 210 where the target node revises the matching replication task. In some embodiments, this can occur by combining the new replication target update with the previous replication target update which caused the node previously to create the matching replication task. This can involve the priority queue manager combining all updates to the replication target, including the data to be changed in the replication target and updates to the write frequency of the replication target into one revised replication task. In some embodiments, this can occur by creating a new replication task for the new replication target update and concatenating the replication tasks such that they remain distinct but will be given one priority value and be processed together (either simultaneously or sequentially). In some embodiments, this can also include updating a timestamp of the combined replication task. In some embodiments, the timestamp will not be updated, so as to prevent the older matching replication task from losing any benefits to priority it had acquired. In other embodiments, the replication task can be given two timestamps, such that a priority calculation regarding the replication task can use both timestamps. In other embodiments, only the newest timestamp of the replication task will be used.

At 212, the target node removes the revised replication task from the queue, or in embodiments using a waiting room, from the waiting room if applicable. This ensures the matching replication task is not processed between revising the replication task and recalculating priority of the replication task. This prevents the same replication target from being updated multiple times in quick succession unless the priority values for the replication tasks call for such. In some embodiments, operation 212 may occur before 210. After 212, method 200 proceeds to 214.

At 214, the priority queue manager, or a priority calculator component of the priority queue manager, calculates a priority value for the replication task. Priority of replication tasks can be calculated using various factors, including the size of the replication target (or alterations to the replication target), the replication target's read frequency on the target node, the replication target's write frequency on the source node, and the age of a data replication task. This can involve the formulas presented above or any of the details discussed above.

At 216, the priority queue manager inserts the replication task into the priority queue (or in embodiments with a waiting room and the replication task having sufficiently low priority, into the waiting room). This can involve placing the replication task into an ordered list in a position dictated by its priority value (i.e., between the replication tasks which have the closest priority values above and below that of the replication task being inserted into the queue). After 216, method 200 proceeds to 218. In some embodiments, a period of time may pass between the replication task being inserted into the queue and operation 218 occurring. During this time, the priority queue manager may move the replication task according to changing priorities of other replication tasks in the queue or return to operation 214 to calculate the priority of the replication task again (such as in embodiments where age of the replication task affects priority of the replication task).

At 218, the target node processes the replication task. The target node may process the replication task using a replication processor (such as 128 of FIG. 1). This can involve writing following the instructions of the replication task to update the replication target to match the alterations made on the source node to the replication target.

After 218, method 200 ends at 220.

Figure 3:
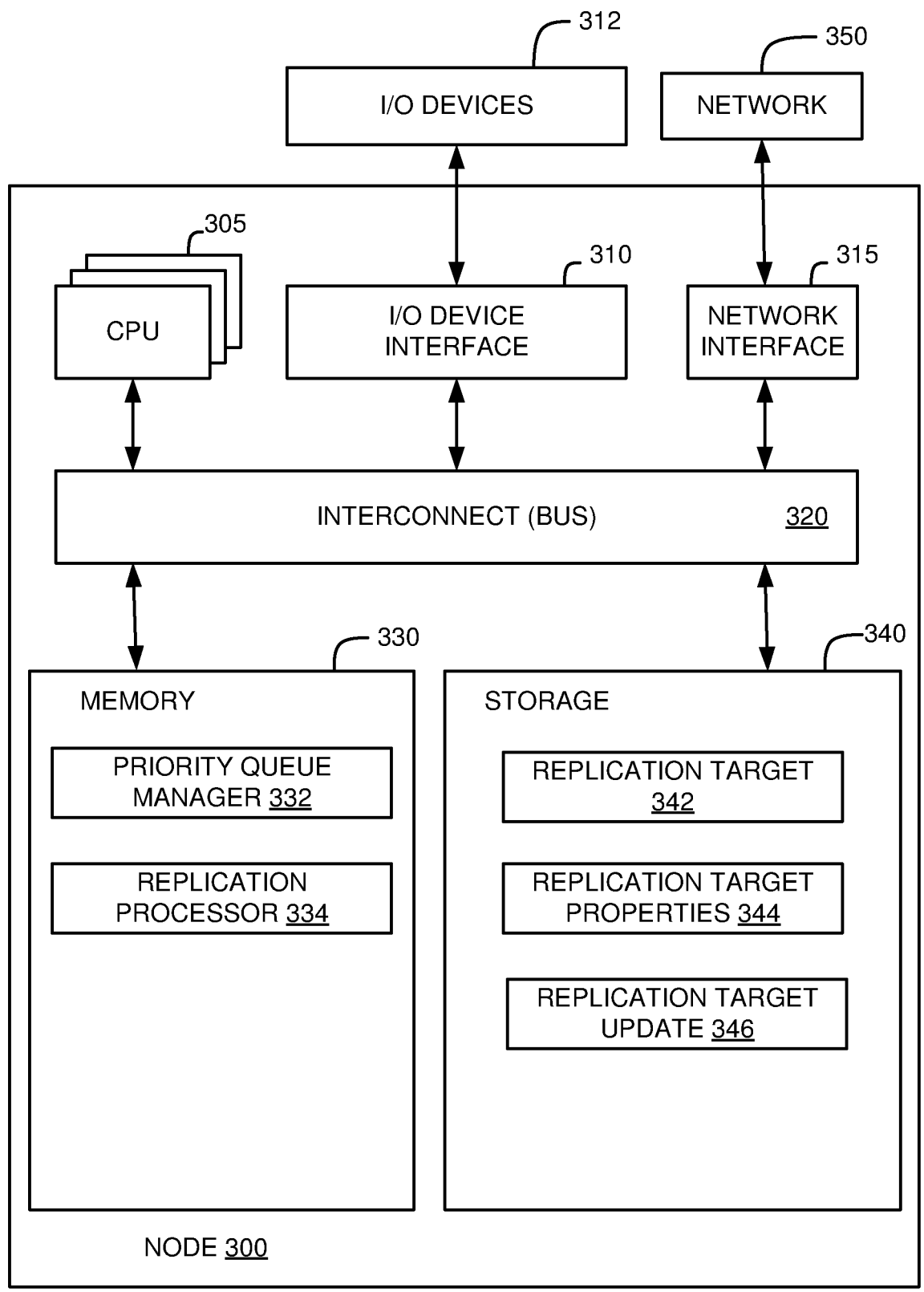
FIG. 3 illustrates a block diagram of a computer node, in accordance with some embodiments of the present disclosure.

Referring now to FIG. 3, illustrated is a block diagram of a computer node 300, in accordance with some embodiments of the present disclosure. In some embodiments, computer node 300 performs operations in accordance with FIGS. 1 and/or 2 as described above. The computer node 300 can include one or more processors 305 (also referred to herein as CPUs 305), an I/O device interface 310 which can be coupled to one or more I/O devices 312, a network interface 315, an interconnect (e.g., BUS) 320, a memory 330, and a storage 340 (which can correspond to storage 104 of FIG. 1).

In some embodiments, each CPU 305 can retrieve and execute programming instructions stored in the memory 330 or storage 340. The interconnect 320 can be used to move data, such as programming instructions, between the CPUs 305, I/O device interface 310, network interface 315, memory 330, and storage 340. The interconnect 320 can be implemented using one or more busses. Memory 330 is generally included to be representative of a random access memory (e.g., static random access memory (SRAM), dynamic random access memory (DRAM), or Flash).

In some embodiments, the memory 330 can be in the form of modules (e.g., dual in-line memory modules). The storage 340 is generally included to be representative of a non-volatile memory, such as a hard disk drive, solid state device (SSD), removable memory cards, optical storage, or flash memory devices. In an alternative embodiment, the storage 340 can be replaced by storage area-network (SAN) devices, the cloud, or other devices connected to the computer node 300 via the I/O devices 312 or a network 350 via the network interface 315.

The CPUs 305 can be a single CPU, multiple CPUs, a single CPU having multiple processing cores, or multiple CPUs with one or more of them having multiple processing cores in various embodiments. In some embodiments, a processor 305 can be a digital signal processor (DSP). The CPUs 305 can additionally include one or more memory buffers or caches (not depicted) that provide temporary storage of instructions and data for the CPUs 305. The CPUs 305 can be comprised of one or more circuits configured to perform one or more methods consistent with embodiments of the present disclosure.

The memory 330 of computer node 300 includes priority queue manager 332 and replication processor 334. Priority queue manager 332 is an application for receiving replication target updates, creating replication tasks, calculating priorities for replication tasks, and placing replication tasks in a priority queue (and in some embodiments a waiting room). Priority queue manager 332 can correspond to priority queue manager 120 of FIG. 1 and perform tasks as described regarding FIG. 2.

Replication processor 334 can be an application for processing replication tasks. Replication processor 334 can correspond to replication processor 128 of FIG. 1 and perform tasks as described regarding FIG. 2.

Storage 340 contains replication target 342, replication target properties 344, and replication target update 346. Replication target 342 can be data in any format which is targeted for replication between two or more nodes.

Replication target properties 344 can be various properties of replication target 342, including a read frequency of replication target 342 on computer node 300 and a write frequency of replication target 342. Replication target properties 344 can correspond to replication target properties 106 of FIG. 1.

Replication target update 346 can be information received by computer node 300 from another node regarding an update to replication target 342. Replication target update 346 can include a write frequency, which can be a new write frequency after any writes performed by other nodes, a size of the replication target or a size of alterations made to the replication target, and, in some embodiments, the substance of the alterations to the replication target 342. Replication target update 346 can correspond to replication target update 112 of FIG. 1.

In some embodiments as discussed above, the memory 330 stores priority queue manager 332 and replication processor 334, and the storage 340 stores replication target 342, replication target properties 344, and replication target update 346. However, in various embodiments, each of the priority queue manager 332, replication processor 334, replication target 342, replication target properties 344, and replication target update 346 are stored partially in memory 330 and partially in storage 340, or they are stored entirely in memory 330 or entirely in storage 340, or they are accessed over a network 350 via the network interface 315.

In various embodiments, the I/O devices 312 can include an interface capable of presenting information and receiving input. For example, I/O devices 312 can receive input from a user and present information to a user and/or a device interacting with computer node 300.

The network 350 can connect (via a physical or wireless connection) the computer node 300 with other networks, and/or one or more devices that interact with the computer node.

Logic modules throughout the computer node 300—including but not limited to the memory 330, the CPUs 305, and the I/O device interface 310—can communicate failures and changes to one or more components to a hypervisor or operating system (not depicted). The hypervisor or the operating system can allocate the various resources available in the computer node 300 and track the location of data in memory 330 and of processes assigned to various CPUs 305. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and replication management 96. Replication management 96 can be a workload or function such as that described in FIGS. 1 and 2 above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for data replication, the method comprising:
   receiving, at a target node, a replication target update, wherein the replication target update comprises a write frequency of a replication target and a size of the replication target;
   creating a replication task to perform replication based upon the replication target update;
   calculating a priority value of the replication task wherein the priority value is based upon the write frequency of the replication target and the size of the replication target;
   inserting the replication task into a priority queue; and
   processing the replication task.

2. The method of claim 1, wherein calculating the priority value of the replication task comprises assigning the priority value using an inverse relationship to the write frequency of the replication target and the size of the replication target.

3. The method of claim 1, wherein the priority value is further based upon a read frequency on the target node of the replication target.

4. The method of claim 3, wherein calculating the priority value of the replication task comprises assigning the priority value using a proportional relationship to the read frequency on the target node of the replication target.

5. The method of claim 1, wherein the priority value is further based upon an age of the replication task.

6. The method of claim 5, further comprising:
   recalculating, after a predetermined time, the priority value of the replication task based upon an updated age of the replication task.

7. The method of claim 1, further comprising:
determining, before creating the replication task, a matching replication task for the replication target is present in the priority queue;
removing the matching replication task from the priority queue; and
wherein creating the replication task additionally comprises using the matching replication task.

8. The method of claim 1, wherein the priority queue comprises a primary queue and a waiting room, wherein the waiting room is present in a different memory than the primary queue.

9. A system for data replication, the system comprising:
one or more processors; and
a memory communicatively coupled to the one or more processors,
wherein the memory comprises instructions which, when executed by the one or more processors, cause the one or more processors to perform a method comprising:
receiving, at a target node, a replication target update, wherein the replication target update comprises a write frequency of a replication target and a size of the replication target;
creating a replication task to perform replication based upon the replication target update;
calculating a priority value of the replication task wherein the priority value is based upon the write frequency of the replication target and the size of the replication target;
inserting the replication task into a priority queue; and
processing the replication task.

10. The system of claim 9, wherein calculating the priority value of the replication task comprises assigning the priority value using an inverse relationship to the write frequency of the replication target and the size of the replication target.

11. The system of claim 9, wherein the priority value is further based upon a read frequency on the target node of the replication target; and wherein calculating the priority value of the replication task comprises assigning the priority value using a proportional relationship to the read frequency on the target node of the replication target.

12. The system of claim 9, wherein the priority value is further based upon an age of the replication task.

13. The system of claim 12, further comprising:
recalculating, after a predetermined time, the priority value of the replication task based upon an updated age of the replication task.

14. The system of claim 9, further comprising:
determining, before creating the replication task, a matching replication task for the replication target is present in the priority queue;
removing the matching replication task from the priority queue; and
wherein creating the replication task additionally comprises using the matching replication task.

15. A computer program product for data replication, the computer program product comprising a computer readable storage medium having program instructions embodied therewith, wherein the computer readable storage medium is not a transitory signal per se, the program instructions executable by a computer to perform a method comprising:
receiving, at a target node, a replication target update, wherein the replication target update comprises a write frequency of a replication target and a size of the replication target;
creating a replication task to perform replication based upon the replication target update;
calculating a priority value of the replication task wherein the priority value is based upon the write frequency of the replication target and the size of the replication target;
inserting the replication task into a priority queue; and
processing the replication task.

16. The computer program product of claim 15, wherein calculating the priority value of the replication task comprises assigning the priority value using an inverse relationship to the write frequency of the replication target and the size of the replication target.

17. The computer program product of claim 15, wherein the priority value is further based upon a read frequency on the target node of the replication target; and wherein calculating the priority value of the replication task comprises assigning the priority value using a proportional relationship to the read frequency on the target node of the replication target.

18. The computer program product of claim 15, wherein the priority value is further based upon an age of the replication task.

19. The computer program product of claim 18, further comprising:
recalculating, after a predetermined time, the priority value of the replication task based upon an updated age of the replication task.

20. The computer program product of claim 15, further comprising:
determining, before creating the replication task, a matching replication task for the replication target is present in the priority queue;
removing the matching replication task from the priority queue; and
wherein creating the replication task additionally comprises using the matching replication task.

* * * * *